United States Patent [19]

McCaskey et al.

[11] 4,371,579

[45] Feb. 1, 1983

[54] FIRE-RESISTANT FILLER SHEET LAMINATES

[75] Inventors: Harold O. McCaskey, Allendale; Melvin E. Benson, Varnville, both of S.C.

[73] Assignee: Westinghouse Electric Corp., Pittsburgh, Pa.

[21] Appl. No.: 195,550

[22] Filed: Oct. 9, 1980

[51] Int. Cl.³ .................... B32B 5/16; B32B 5/28; B32B 5/30
[52] U.S. Cl. .................... 428/204; 162/159; 162/168.1; 162/181.2; 162/181.6; 428/237; 428/239; 428/241; 428/242; 428/285; 428/286; 428/287; 428/324; 428/328; 428/331; 428/701; 428/702; 428/920
[58] Field of Search ............... 162/159, 181 A, 181 C, 162/168 R; 428/241, 920, 204, 324, 328, 331, 701, 237, 239, 285, 286, 287, 702

[56] References Cited

U.S. PATENT DOCUMENTS

| | | |
|---|---|---|
| 3,018,206 | 1/1962 | Hood et al. |
| 3,220,918 | 11/1965 | Shisko .................. 162/159 |
| 3,523,061 | 8/1970 | Purvis .................. 428/324 |
| 3,881,978 | 5/1975 | Livingston et al. .................. 156/247 |
| 4,157,414 | 6/1979 | Smith .................. 428/324 |
| 4,244,781 | 1/1981 | Heckman .................. 162/159 |
| 4,247,364 | 1/1981 | Culp .................. 428/324 |
| 4,259,398 | 3/1981 | Seino et al. .................. 428/324 |
| 4,262,788 | 4/1981 | Yamamoto et al. .................. 428/328 |
| 4,269,628 | 5/1981 | Ballard et al. .................. 428/920 |
| 4,271,228 | 6/1981 | Foster et al. .................. 428/328 |
| 4,273,825 | 6/1981 | Nishiyama et al. .................. 428/247 |

Primary Examiner—James C. Cannon
Attorney, Agent, or Firm—D. P. Cillo

[57] ABSTRACT

A fire-resistant laminate is made, comprising a plurality of heat and pressure consolidated thermoset resin impregnated filler sheets, where the filler sheets before resin impregnation comprised from about 60 wt. % to about 90 wt. % inorganic filler, up to about 25 wt. % cellulose fibers and from about 0.5 wt. % to about 20 wt. % resinous binder.

7 Claims, 2 Drawing Figures

FIRE-RESISTANT FILLER SHEET LAMINATES

BACKGROUND OF THE INVENTION

Asbestos as a core material in the laminating industry has for years been almost indispensable. The fire resistance, lubricity, and wear resistance of asbestos fiber, has made it a standard material for washers, gaskets, wear strips and decorative composite laminate members, such as flame resistant wall panels and the like. One of the most widely used forms of asbestos as a core material in laminating has been asbestos paper, which comprises between 85 wt. % to 90 wt. % asbestos fiber. The bulk density and porosity of this paper was such that saturation by certain thermosetting resins, such as phenolic and melamine-aldehyde resins, was possible. Resin impregnation provided a material suitable for the production of high pressure thermosetting laminates, as taught by Hood et al., in U.S. Pat. No. 3,018,206. However, various problems have been associated with asbestos fiber, and a substitute for asbestos paper is needed in the laminating industry.

SUMMARY OF THE INVENTION

The above need has been met by using a sheet material manufactured from inorganic filler, cellulose fibers, and resinous binder. In its most preferred embodiment, the sheet material comprises from about 60 wt. % to about 90 wt. % inorganic filler, 0 wt. % to about 25 wt. % cellulose fibers such as wood or cotton linter fibers, and an amount of resinous binder effective to bond the filler and cellulose fibers together in sheet form, usually from about 0.5 wt. % to about 20 wt. %. Useful filler includes, for example, magnesium hydroxide, magnesium carbonate, calcium carbonate, mica, and their mixtures.

This filler sheet material has good strength, wear, lubricity and fire retardant properties, and is saturable with thermosetting resins. This sheet material also has good cold shear and cold punch properties, which are important properties for washers, gaskets, and the like. When a plurality of these filler sheet materials are impregnated with thermosetting resin and molded under heat and pressure, the resulting composite is a suitable asbestos laminate substitute for many applications requiring high heat resistance and low to medium mechanical strength. As used herein, the term "filler sheets" means sheets containing major portions of filler material, usually in particulate form.

BRIEF DESCRIPTION OF THE DRAWINGS

For a better understanding of the invention, reference may be made to the preferred embodiments exemplary of the invention, shown in the accompanying drawings, in which.

DESCRIPTION OF THE PREFERRED EMBODIMENTS

Figure 1:
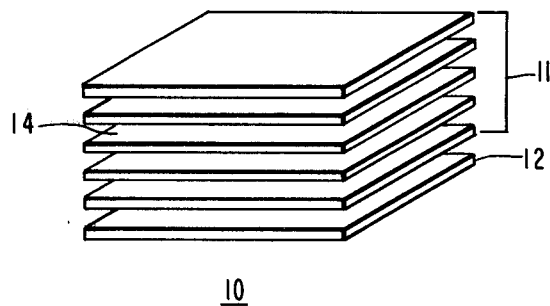
FIG. 1 is a schematic view of an assembly of sheets in accordance with one embodiment of this invention, providing a fire-resistant composite laminate surfaced with glass mat.

Referring now to FIG. 1 of the drawings, an assembly of sheets comprising a laminate stackup 10 is shown. A plurality of filler sheets 11 are shown stacked on top of a glass mat sheet 12. The filler sheets 11 can range in thickness from about 0.005 inch to about 0.075 inch. The filler sheets comprise from about 60 wt. % to about 90 wt. % inorganic filler; 0 wt. % to about 25 wt. % preferably from about 5 wt. % to about 20 wt. % cellulose fibers such as wood or cotton linter fibers; and an amount of a suitable resinous binder effective to bind the filler and fibers together in sheet form, usually from about 0.5 wt. % to about 20 wt. %, preferably from about 0.5 wt. % to about 10 wt. %. Under about 60 wt. % filler, flame retardant properties are lowered. Over about 90 wt. % filler, it is difficult to form a continuous sheet material.

Useful fillers are selected from aluminum trihydrate, magnesium silicate, magnesium hydroxide, magnesium carbonate, calcium silicate, calcium carbonate, mica, silica, their mixtures, and the like. These fillers are usually in particulate form having particle sizes up to about 88 micron (170 mesh), with most between about 2 micron to about 40 micron. The wood cellulose fibers have lengths up to about 2 mm. (9 mesh) and comprise suitably treated and screened wood pulp. The cotton linter fibers, which can be used alone or with wood fibers, also have lengths up to about 2 mm. The cotton linters are the short hair seed fibers which adhere to the cottonseed boll when the staple cotton "lint" or textile fibers are ginned from the seed.

Useful resinous binders include rubbers, such as butadiene-styrene, and resinous materials, such as polyvinyl acetate, polyvinyl chloride, polymethyl acrylate, polyethyl acrylate, polymethyl metacrylate, polysytrene and the like. Any resinous binder is useful that, in the quantity added, will not seriously degrade the flame resistant properties of the filler sheet. In addition, up to about 10 wt. % of glass fibers, having lengths up to about 40 mm. can be added to improve dimensional stability of the filler sheet. These ingredients can be combined in any paper making process, such as in a Fourdrinier machine, as is well known in the art to produce a continuous sheet material. The filler in the sheet will be homogeneously dispersed within a matrix or web of cellulose fibers and/or resinous binder.

These filler sheets 11, may be impregnated with a thermosetting resin selected from epoxy resin, polyester resin, melamine resin, silicone resin, polyimide resin, and preferably phenolic resin. These resins are well known, and details of their preparation are set forth in *Plastics Materials*, Brydson, 1966, chapters 15, 19, 20, 21, 22 and 25, herein incorporated by reference. The filler sheet is impregnated to a resin ratio of from about 1.20 to about 4.0, i.e., impregnated filler sheet weight/dry filler sheet weight. It is very important for the resin loading to be within this range for proper consolidation of the filler sheets during molding. The impregnated filler sheet is then dried to the "B" stage, i.e., non-tacky and dry to the touch, but capable of being finally cured to the thermoset state.

These filler sheets comprise a core which may be heat and pressure consolidated and used alone. The filler sheets may also be laminated with or to a variety of other substrates, such as an impregnated or unimpregnated fibrous glass sheet 12, shown in FIG. 1, or a melamine impregnated decorative print sheet 20 and a melamine impregnated overlay sheet 21, shown in FIG. 2. The filler sheets may also comprise a core disposed between various substrates, such as pigmented paper print sheets or glass fiber sheets. The core may also contain one or more fibrous glass sheets, which in FIG. 1 could be sheet 14, centrally located between the filler sheets. A particularly strong core can be made with a center of thermoset resin impregnated glass cloth, having thermoset resin impregnated filler sheets disposed on both sides of the glass cloth.

Figure 2:
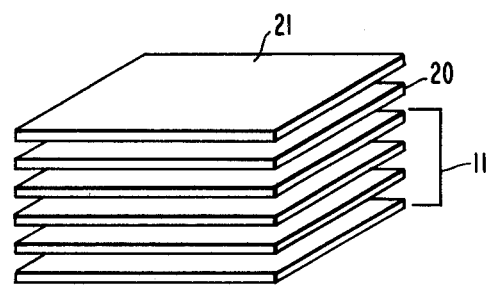
FIG. 2 is a schematic view of an assembly of sheets in accordance with one embodiment of this invention, providing a decorative, fire-resistant composite laminate.

The decorative laminate shown in FIG. 2 can be adhesively bonded to a rigid backing sheet of fire-resistant material having a thickness of from about ¼ inch to 1 inch to provide suitable fire-resistant panels. The panels thus produced are well suited for structural materials for the marine industry, hospitals, and the like where fireproof structures are required. The adhesive composition employed is preferably a fire-resistant type such as the silicon type adhesives.

The decorated surface layer may comprise at least one print sheet of alpha-cellulose paper, thin cotton fabric, silk, glass fabric, or the like, with a design imprinted thereon, or the sheet may be pigmented throughout. Pigmented sheets with designs imprinted thereon may also be employed. Ordinarily, a resin impregnated protective overlay sheet is employed over sheets having designs imprinted thereon to provide better abrasion resistance and good surface appearance thereto. Pigmented print sheets that have no design imprinted thereon will ordinarily have good abrasion resistance and hence an overlay sheet is not required. Suitable materials for overlay sheets include rayon, glass fabric and alpha-cellulose paper.

High pressure laminating techniques can be employed in preparing the laminates from the above described assemblies comprising core filler sheets. Temperatures ranging from about 120° C. to about 180° C. and pressures ranging from about 250 psi. to 1,500 psi. are employed. The time required, at these temperatures, to effect a cure of the resinous components of the assembly will usually be from about 3 minutes to about 300 minutes, depending on the resin system used. The resulting laminate, which can range in thickness from about 1/16 inch to about ¾ inch, is generally allowed to cool to between about 50° C. to 85° C. before being removed from the press. The cooling step generally takes between about 30 to 90 minutes. Generally, the assembly will require a 15 to 45 minute warm up period before the 120° C. to 180° C. curing temperatures are reached in the press.

EXAMPLE 1

Filler sheet material, having a thickness of 0.035 inch, a density of about 55 lb./cu.ft., and comprising about 78 wt. % magnesium hydroxide, about 17 wt. % wood fiber, about 4 wt. % polystyrene binder, and about 1 wt. % moisture was impregnated with a phenolic resin by a dip and metering process to give a resin ratio of impregnated sheet weight/dry sheet weight of 1.43. The resin impregnated filler sheet material was then passed through a forced air drying oven to "B" stage the resin impregnated sheet.

Four resin impregnated sheets, comprising a laminate stack-up, were placed between steel pressing plates and molded at 500 psi and 180° C. for 30 minutes. After cooling to 30° C. while under pressure, the press was released to provide a unitary, consolidated, cured, thermoset laminate about ⅛ inch thick. This laminate was tested according to Underwriters Laboratories, Inc. "Standard Test For Flammibility Of Plastic Materials For Parts In Devices And Appliances" (UL 94), where it received a 94VO rating, indicating outstanding flame resistance. Other test results were as follows:
Flexural Strength (with grain) 12,109 psi
Flexural Strength (cross grain) 10,732 psi
Edgewise Impact (with grain) 0.404 ft/lbs
Edgewise Impact (cross grain) 0.381 ft/lbs
Compressive Strength 23,567 psi
Dielectric Breakdown (parallel) 13.8 KV
Water Absorption 0.486%

As can be seen, this laminate provides high heat resistance and good strength, electric and water resistance properties.

EXAMPLE 2

Filler sheet material, having a thickness of 0.035 inch, a density of about 55 lb./cu. ft., and comprising about 78 wt. % magnesium hydroxide, about 17 wt. % wood fiber, about 4 wt. % polystyrene binder, and about 1 wt. % moisture was impregnated with a phenolic resin by a dip and metering process to give a resin ratio of impregnated sheet weight/dry sheet weight of 1.43. The resin impregnated filler sheet material was then passed through a forced air drying over to "B" stage the resin impregnated sheet.

Eight laminate stack-up assemblies were made, each containing two sheets of the above described resin impregnated filler sheet core disposed between a top and bottom sheet of "B" staged, pigmented decorative paper impregnated with phenolic resin. These assemblies were placed between steel pressing plates and molded at 500 psi and 123° C. for 30 minutes. After cooling to 30° C. while under pressure, the press was released to provide unitary, consolidated, cured, thermoset, 1/16 inch thick decorative laminate panels. These laminates were tested for cold shearing and cold punching with excellent results. Other test results was as follows:
Flexural Strength (with grain) 13,412 psi
Flexural Strength (cross grain) 11,323 psi
Water Absorption 2.13%
Dielectric Breakdown (parallel) 60 KV
Hardness-Rockwell M 63

As can be seen, these laminates provided a material useful for making wear resistant washers and gaskets.

EXAMPLE 3

Filler sheet material, having a thickness of 0.035 inch, a density of about 55 lb./cu. ft., and comprising about 78 wt. % magnesium hydroxide, about 17 wt. % wood fiber, about 4 wt. % polystyrene binder, and about 1 wt. % moisture was impregnated with a phenolic resin by a dip and metering process to give a resin ratio of impregnated sheet weight/dry sheet weight of 1.43. The resin impregnated filler sheet material was then passed through a forced air drying over to "B" stage the resin impregnated sheet.

Sixteen resin impregnated filler sheets were disposed between a top and bottom sheet of unimpregnated glass mat, to provide a laminate stack-up assembly. This assembly was placed between steel pressing plates and molded at 500 psi and 123° C. for 30 minutes. After cooling to 30° C. while under pressure, the press was released to provide unitary, consolidated, cured, thermoset, ¼ inch thick laminate. This laminate was tested as follows:
Flexural Strength (with grain) 9,600 psi
Flexural Strength (cross grain) 8,300 psi
Edgewise Impact (with grain) 0.43 ft/lbs.

Edgewise Impact (cross grain) 0.40 ft/lbs.
Tensile Strength (with grain) 5,680 psi
Tensile Strength (cross grain) 4,860 psi
Compressive Strength 23,000 psi
Water Absorption 0.173%
Flame Test (UL 94) 94VO As can be seen, laminates comprising a resin impregnated filler sheet core can be consolidated to thick sections, to provide very good strength and water resistance properties, and outstanding heat resistance. The various other fillers and binders described within the ranges set forth hereinabove can also be used with equally good results.

We claim:

1. A fire-resistant laminate comprising a plurality of thermoset resin impregnated filler sheets, the filler sheets before resin impregnation consisting of from about 60 wt. % to about 90 wt. % inorganic filler selected from the group consisting of aluminum trihydrate, magnesium silicate, magnesium hydroxide, magnesium carbonate, calcium silicate, calcium carbonate, mica, silica, and mixtures thereof, from about 5% up to about 25 wt. % cellulose fibers and from about 0.5 wt. % to about 20 wt. % resinous binder, the plurality of thermoset resin impregnated filler sheets being heat and pressure consolidated and bonded together into a unitary member, and having a resin ratio of from about 1.20 to about 4.0.

2. The fire-resistant laminate of claim 1 also containing at least one fibrous glass sheet.

3. The fire-resistant laminate of claim 1 also containing at least one decorative, resin impregnated surface sheet.

4. The fire-resistant laminate of claim 1 also containing up to about 10 wt. % glass fibers having lengths up to about 40 mm.

5. The fire-resistant laminate of claim 1, where the thermoset resin impregnating the filler sheets is selected from the group consisting of epoxy resin, polyester resin, melamine resin, silicon resin, polyimide resin and phenolic resin, and the resin impregnated filler sheets are consolidated and bonded at temperatures ranging from about 120° C. to about 180° C., and pressures ranging from about 250 psi. to 1,500 psi.

6. The fire-resistant laminate of claim 1, where the thermoset resin impregnating the filler sheets is a phenolic resin, and the laminate contains at least one centrally located phenolic resin impregnated fibrous glass sheet disposed between the resin impregnated filler sheets.

7. The fire-resistant laminate of claim 1, wherein the thermoset resin impregnating the filler sheets is a phenolic resin, and the laminate contains at least one resin impregnated print sheet disposed on at least one side of the resin impregnated filler sheets.

* * * * *